Sept. 8, 1931.  C. A. BOWLUS  1,822,197

WELDING

Filed Dec. 6, 1929

INVENTOR
CLAUDE A. BOWLUS.
BY
ATTORNEY

Patented Sept. 8, 1931

1,822,197

UNITED STATES PATENT OFFICE

CLAUDE A. BOWLUS, OF BIRMINGHAM, MICHIGAN, ASSIGNOR TO CHRYSLER CORPORATION, OF DETROIT, MICHIGAN, A CORPORATION OF DELAWARE

WELDING

Application filed December 6, 1929. Serial No. 412,246.

This invention relates to welding, particularly of superimposed and overlapped articles having substantially planular surfaces.

Heretofore, integrally securing plates and sheets of metal materials together by welding at limited areas, such as in spots and ridges, those portions of one member adjacent the integral bonds have curled away from the corresponding portions of the other member when the pressure and heat applied during the welding operation was discontinued. As a result of this action the portions of the materials between the bonds were not held in intimate contact with each other.

The main objects of my invention are to provide an improved method for welding limited portions of adjacent surfaces of plates and sheets of metal materials together; to provide an improved construction for the portions of such materials that are integrally secured together which will prevent upturning and separation of the adjacent parts of one member with respect to another; to provide a recess between members of this kind for receiving the excess fluxed metal produced during the welding operations; and to provide an improved formation of the portions of plates and sheets of metal materials that are to be secured together by ridge or spot welding operations which is adapted to obviate separation of the adjacent parts by the resiliency and thermal contraction of the materials when the pressure and heat to which such materials are subjected during welding are discontinued.

An illustrative embodiment of my invention is shown in the accompanying drawings, in which.

Figure 1:
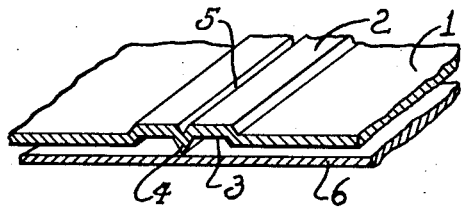
Fig. 1 is a perspective view, partly is section, showing a pair of metal members embodying my invention as they appear before welding.
Figure 2:
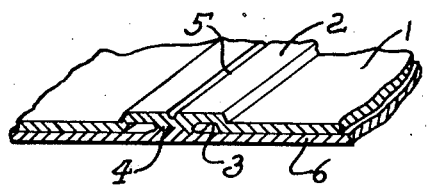
Fig. 2 is a perspective view, partly in section, showing the plates illustrated in Fig. 1 as they appear after they have been welded.

In the form of my invention shown in Figs. 1 and 2, an upper plate 1 of a pair of superimposed or overlapped members is provided with an offset portion 2 which forms a channel-way 3 on the lower side of the member. The offset 2 and channel-way 3 may extend longitudinally from end to end of the member 1 or it may extend laterally from side to side of the plate as required by the particular construction in which the members are employed.

Formed on the plate 1 between the side extremities of the channel-way 3 is a substantially V-shaped ridge or projection 4 which extends longitudinally of the channel-way or recess 3 and protrudes beyond the open side thereof. This ridge is preferably formed by a rolling operation during which a score 5 is made in the top side of the member 1 so as to force the bottom side of the member outwardly with respect to the recess.

When the plate 1 is to be integrally secured by welding to a second plate or sheet 6, the two members are arranged as illustrated in Fig. 1 with the ridge 4 resting upon the adjacent surface of the plate 6. Pressure and heat is then applied to the ridge 4 and the portions of the plate 6 with which the ridge 4 registers. As the metal of the ridge 4 and the metal of the plate 6 are fluxed together, the excess fluxed materials spread out and are accommodated by the spaces between the ridge and the respectively opposite side extremities of the channel-way 3.

The welded members as shown in Fig. 2 are thus integrally secured together at limited areas and the portions of the members which are adjacent the integral bond are firmly held in intimate contact with each other.

Figure 4:
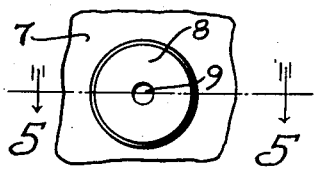
Fig. 4 is a top plan of the form of my invention shown in Fig. 3.
Figure 3:
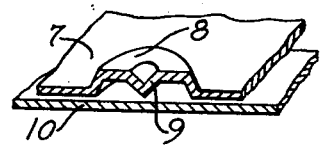
Fig. 3 is a perspective view, partly in section, of a pair of metal plates embodying another form of my invention.
Figure 5:
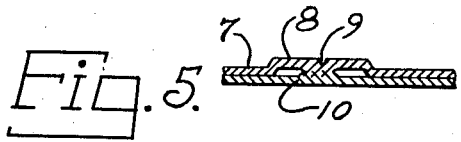
Fig. 5 is a vertical section taken on line 5—5 of Fig. 4.

In the form of my invention shown in Figs. 3, 4 and 5, the upper member 7 is provided with an offset portion 8 which is circular in form. Formed at the center of the circular offset 8 is a projection 9 which extends beyond the lower side of the plate 7 as shown in Fig. 3. The offset 8 and the projection 9 are preferably formed by stamping or punching operations.

The member 7 may be conveniently spot welded to another plate 10 by placing the members in superimposed or overlapped relation with the projection 9 abutting the surface of the member 10, and applying heat and pressure to the offset part 8, projection 9 and the portions of the lower plate 10 with which the projection 9 registers. The space between the inner periphery of the offset 8 and the projection 9 accommodates the fluxed materials of the projection 9 and the member 10 during the welding operation, and when the pressure and the heat is removed the portions of the members 7 and 8 adjacent the offset 8 are firmly held together.

Figure 6:
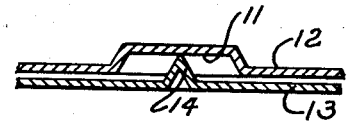
Fig. 6 is a vertical section showing a modified form of my invention.

A recess 11 or channel-way may be formed in one of the members 12 and 13 of Fig. 6 and a projection 14 may be formed on the other member if desired. With this construction it is necessary to place predetermined parts of the plate 12 in registration with predetermined portions of the plate 13. The advantages of my invention may also be obtained by employing a bonding member of metal, which is different from the metal of the members to be secured together, in recesses of the types shown.

Although but one specific embodiment of this invention has herein been shown and described, it will be understood that various changes including the size, shape and arrangement of parts, may be made without departing from the spirit of my invention and it is not my intention to limit its scope other than by the terms of the appended claims.

I claim:

1. In a pair of superimposed metal plates, one plate including a cup shaped chamber having an open side adjacent the other plate and a substantially flat marginal portion surrounding said open side and parallel to the plane of said latter plate, and a projection on one of said plates extending through said chamber in spaced relation to the side walls thereof, said projection being integral at one end with one plate and fused at its opposite end to the other plate.

2. In a structure, a metal plate including a cup shaped depression having an open side and a substantially flat marginal portion surrounding said open side and disposed in the plane of said plate, a second plate seated upon said first plate and contacting with said marginal portions, a projection integral with said second plate extending centrally of said depression in spaced relation to the sides thereof, the end of said projection being fused to the end wall of said depression.

3. In a structure, a metal plate including a cup shaped depression having an open side and a substantially flat marginal portion surrounding said open side and disposed in the plane of said plate, a second plate seated upon said first plate and contacting with said marginal portions, a projection integral with the end wall of said depression extending through said depression in spaced relation to the sides thereof and having a fused attachment to the end wall of said depression.

CLAUDE A. BOWLUS.